(12) United States Patent
Choi et al.

(10) Patent No.: US 7,848,124 B2
(45) Date of Patent: Dec. 7, 2010

(54) OVERLOAD AND SHORT PROTECTED SOFT-START CONVERTER

(75) Inventors: Hang-Seok Choi, Kunpo (KR);
Young-Bae Park, Anyang (KR);
Gwan-Bon Koo, Bucheon (KR);
Jin-Tae Kim, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 434 days.

(21) Appl. No.: 12/079,184

(22) Filed: Mar. 25, 2008

(65) Prior Publication Data

US 2008/0259659 A1    Oct. 23, 2008

(30) Foreign Application Priority Data

Apr. 23, 2007    (KR) .................. 10-2007-0039286

(51) Int. Cl.
*H02H 7/122* (2006.01)
*H02M 3/335* (2006.01)
(52) U.S. Cl. .................. 363/56.1; 363/56.11
(58) Field of Classification Search .............. 363/21.07, 363/21.08, 21.15, 21.16, 49, 55, 56.01, 56.03, 363/56.09, 56.1, 56.11, 97
See application file for complete search history.

(56) References Cited

U.S. PATENT DOCUMENTS

| | | | | |
|---|---|---|---|---|
| 4,937,727 A | * | 6/1990 | Leonardi | 363/97 |
| 5,745,358 A | * | 4/1998 | Faulk | 363/95 |
| 6,061,257 A | | 5/2000 | Spampinato et al. | |
| 6,208,528 B1 | * | 3/2001 | Soto et al. | 363/15 |

* cited by examiner

*Primary Examiner*—Gary L Laxton
(74) *Attorney, Agent, or Firm*—Sidley Austin LLP (57) ABSTRACT

A converter and a driving method thereof are provided. The converter can determine the output short state of the converter after the soft start is finished by using a detection signal that corresponds to an input signal while a switched is turned on and that corresponds to an output signal while the switch is turned off, so as to convert the input signal into the output signal according to a switching operation of the switch. The converter can determine the overload state of the converter by using a feedback voltage corresponding to the output signal, and terminate the switching operation when the converter is in an output short state or overload state.

25 Claims, 6 Drawing Sheets

OVERLOAD AND SHORT PROTECTED SOFT-START CONVERTER

CROSS-REFERENCE TO RELATED APPLICATION

This application claims priority to and the benefit of Korean Patent Application No. 10-2007-0039286 filed in the Korean Intellectual Property Office on Apr. 23, 2007, the entire contents of which are incorporated herein by reference.

BACKGROUND

1. Field of the Invention

The present invention relates to a converter employing soft start and protection functions. In particular, the present invention relates to a switch controller for controlling a switching operation of a converter employing a soft-start and protection functions, a switch control method, a converter using the same, and a driving method thereof.

2. Description of the Related Art

In general, a converter includes a protection circuit to protect the converter from various irregular conditions. The irregular conditions may include an overload that is generated when a load connected to an output terminal increases, an output short, an output over/under voltage, and an output diode short. In the case of an overload, a drain current flowing through a switch for controlling the converter's operation increases above its normal range and reaches a threshold value. One of the conventional methods protects the converter by terminating the switching operation when the drain current reaches a threshold value in the case of an overload or an output short. The converter may be shut down for a transition period in which the load returns to a regular value. The converter may also shut down during a startup operation. This can cause a premature shutdown, when the converter is stopped before it starts its normal operation.

Typical converters have a minimum turn-on time because of an internal delay time and a leading edge blanking (LEB) time. Conventional converters do not control the drain current during the minimum turn-on time. When the converter's output terminal becomes shorted, excessive drain current flows through the switch during the minimum turn-on time, possibly damaging the switch.

The above information disclosed in this Background section is only for the enhancement of understanding and therefore it may contain information that is not prior art that is already known in this country to a person of ordinary skill in the art.

SUMMARY

The present invention has been made in an effort to provide a converter and a driving method thereof having advantages of preventing premature shutdown in the case of an overload, and instantly terminating the switching operation when the output terminal becomes shorted.

In one aspect of the present invention, a method for driving a converter for converting an input signal into an output signal according to a switching operation by a switch includes: determining a output short state of the converter when a soft start is finished by using a detection signal that corresponds to an input signal while the switch is turned on and that corresponds to an output signal while the switch is turned off; determining an overload state of the converter by using a feedback voltage corresponding to the output signal; and terminating the switching operation when the converter corresponds to one of the output short state and the overload state. The determining of the output short state includes: determining whether the soft start is finished; comparing the detection signal and a output short threshold voltage having a predetermined level; and determining whether a first delay time in which noise of the detection signal is removed is passed after the switch is turned off. The determining of the overload state includes comparing the feedback voltage and the overload threshold voltage, wherein the overload threshold voltage is set to be the level of the feedback voltage when the overload state of the converter is maintained for a predetermined time.

In another aspect of the present invention, a converter for converting an input signal into an output signal according to a switching operation by a switch includes a switch controller that: determines a output short state of the converter by using a detection signal after the soft start is finished; determines an overload state of the converter by using a feedback voltage corresponding to the output signal; and terminates the switching operation when the converter is in one of the overload state and the output short state, and wherein the detection signal corresponds to the input signal while the switch is turned on and corresponds to the output signal while the switch is turned off. The switch controller determines the output short state according to the comparison result of the detection signal and the output short threshold voltage when the switch is turned off and a delay time is passed, and the output short threshold voltage is greater than the voltage of the detection signal corresponding to the output signal of the converter. The delay time is set so as to prevent noise of the detection signal. The switch controller compares the feedback voltage and the overload threshold voltage to determine the overload state, and the overload threshold voltage is set to be the level of the feedback voltage when the overload state of the converter is maintained for a predetermined time.

In another aspect of the present invention, a converter includes: a switch; a power supply for converting an input signal according to a switching operation by the switch and supplying power; an output unit for generating an output signal by using the supply power; a feedback circuit for generating a feedback voltage corresponding to the output signal; and a switch controller for determining a output short state of the converter by using a detection signal after the soft start is finished, determining an overload state of the converter by using a feedback voltage corresponding to the output signal, and terminating the switching operation when the converter is in one of the overload state and the output short state, wherein the detection signal corresponds to the input signal while the switch is turned on and corresponds to the output signal while the switch is turned off. The switch controller includes: a output short determiner for determining the output short state by using the detection signal; an overload determiner for determining an overload state by using the feedback voltage; and a PWM controller for controlling the switch according to a feedback signal corresponding to the feedback voltage, a current flowing to the switch, and determination results of the output short determiner and the overload determiner. The output short determiner includes: a first comparator for comparing the detection signal and a output short threshold voltage, and generating a first signal according to the comparison result; and a first logical operator for receiving a soft start finish signal for indicating the soft start finish, the first signal, and an output pulse signal that is generated according to a time when the switch is turned off and a delay time elapses, wherein the output short threshold voltage is greater than the voltage of a detection signal corresponding to an output signal of the converter in the output short state, and the delay time is set so as to prevent noise of the detection signal. Herein, the soft start finish signal is high, the first signal becomes high when the detection signal is less than the output short threshold voltage, the output pulse signal becomes high when the delay time elapses, and the logical operator performs an AND operation. The overload determiner includes a second comparator for comparing the feedback voltage and an overload threshold voltage, and the overload threshold voltage is set to be the level of the feedback voltage when the overload state of the converter is maintained for a predetermined time. The switch controller further includes a protection determiner for generating a protection signal for terminating the switching operation when the state is one of the overload state and the output short state. The protection determiner includes: a second logical operator for receiving output signals of the first comparator and the second comparator; and a first flip-flop for generating the protection signal according to an output signal of the second logical operator, and resetting the protection signal when a voltage for an internal bias for the switch controller is less than a predetermined voltage. The second logical operator performs an OR operation on the output signals of the first comparator and the second comparator, and the first flip-flop generates a high level protection signal when the output signal of the second logical operator is high. The PWM controller includes: a third comparator for comparing the feedback signal and a sense voltage corresponding to the current flowing to the switch when the soft start is finished; an oscillator for generating clock signals with a predetermined period; a second flip-flop for receiving the output signal of the third comparator through a reset terminal and receiving the clock signals through a set terminal; a third logical operator for receiving an output signal of an inversion terminal of the second flip-flop, the protection signal, and the clock signal, and generating a second signal for turning off the switch when one of the input signals is a first level; and a gate driver for generating the gate control signal according to the second signal. The output short determiner includes: an inverter for inverting the second signal; a delay unit for delaying the inverted second signal by a delay time; and a vibrator for generating an output pulse signal in synchronization with an output signal of the delay unit.

In another aspect of the present invention, a converter includes: a transformer for transforming input energy into output energy; a switch connected to a primary coil of the transformer and controlling the transformer; an auxiliary coil for generating an auxiliary voltage corresponding to a voltage of a secondary coil of the transformer when the switch is turned off; and a switch controller for determining a output short state of the converter by using a detection voltage corresponding to the auxiliary voltage when a soft start is finished, determining an overload state of the converter by using a feedback voltage corresponding to the output energy, and terminating the switching operation when the converter is in one of the overload state and the output short state. The switch controller includes: a first comparator for comparing the detection signal and a output short threshold voltage, and generating a first signal according to a comparison result; a output short determiner including a first logical operator for receiving a soft start finish signal for indicating the soft start finish, the first signal, and an output pulse signal that is generated according to a time when the switch is turned off and a delay time elapses; and a PWM controller for controlling the switch according to a feedback signal corresponding to the feedback voltage, a current flowing to the switch, and determination results of the output short determiner and the overload determiner, wherein the output short threshold voltage is greater than the voltage of a detection signal corresponding to an output signal of the converter in the output short state, and the delay time is set so as to prevent noise of the detection signal. Herein, the soft start finish signal is high, the first signal becomes high when the detection voltage is less than the output short threshold voltage, the output pulse signal becomes high when the delay time elapses, and the logical operator performs an AND operation. The switch controller further includes an overload determiner including a second comparator for comparing the feedback voltage and an overload threshold voltage, and the overload threshold voltage is set to be the level of the feedback voltage when the overload state of the converter is maintained for a predetermined time. The switch controller further includes a protection determiner for generating a protection signal for terminating the switching operation when the state is one of the overload state and the output short state. The protection determiner includes: a second logical operator for receiving output signals of the first comparator and the second comparator; and a first flip-flop for generating the protection signal according to an output signal of the second logical operator, and resetting the protection signal when a voltage at a capacitor charged by the current that flows to the auxiliary coil is less than a predetermined voltage. The second logical operator performs an OR operation on the output signals of the first comparator and the second comparator, and the first flip-flop generates a high level protection signal when the output signal of the second logical operator is high. The PWM controller includes: a third comparator for comparing the feedback signal and a sense voltage corresponding to the current flowing to the switch when the soft start is finished; an oscillator for generating clock signals with a predetermined period; a second flip-flop for receiving the output signal of the third comparator through a reset terminal and receiving the clock signals through a set terminal; a third logical operator for receiving an output signal of an inversion terminal of the second flip-flop, the protection signal, and the clock signal, and generating a second signal for turning off the switch when one of the input signals is a first level; and a gate driver for generating the gate control signal according to the second signal. The output short determiner includes: an inverter for inverting the second signal; a delay unit for delaying the inverted second signal by a delay time; and a vibrator for generating an output pulse signal in synchronization with an output signal of the delay unit.

DETAILED DESCRIPTION

In the following detailed description, only certain exemplary embodiments are shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. Similar parts throughout the specification have similar reference numerals.

Throughout this specification and the claims that follow, the description of an element being "coupled" to another element refers to a direct electrical connection between these elements.

Figure 1:
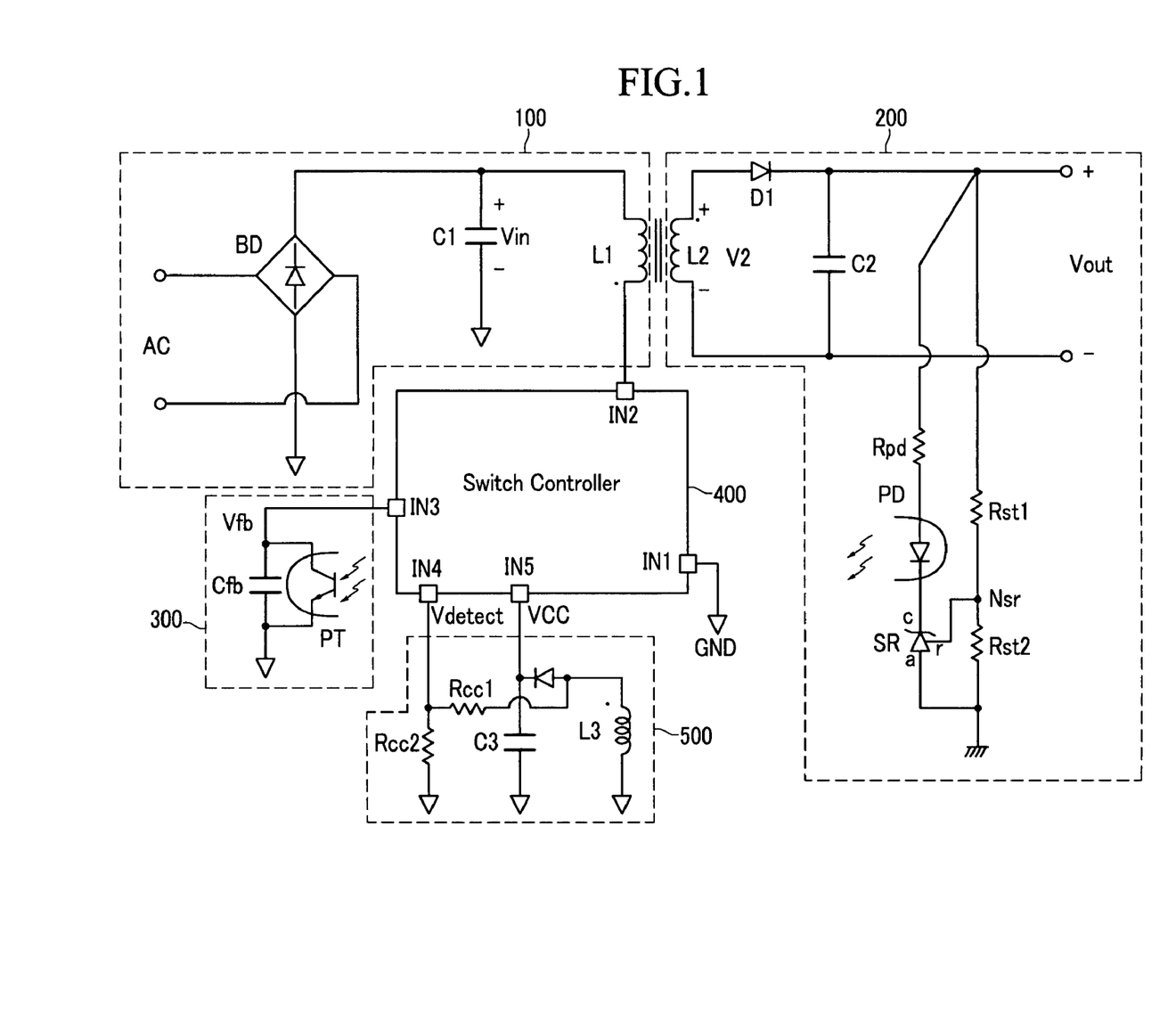
FIG. 1 shows a configuration of a converter including a switch controller according to an exemplary embodiment.

FIG. 1 shows a configuration of a converter including a switch controller according to an embodiment.

The converter may include a power supply 100, an output unit 200, a feedback circuit 300, and a switch controller 400. A switch M may be integrated into the switch controller 400, forming an integrated circuit (IC). In some embodiments the switch and the switch controller can be configured in individual packages, which may be configured as an IC.

The power supply 100 may include a full-wave bridge rectifier BD for rectifying an AC input AC, a capacitor C1 for smoothing the rectified voltage, and a primary coil L1 of a transformer connected to an input voltage Vin. A first terminal of the primary coil L1 of the transformer may be connected to an input terminal IN2 of the switch controller 400. The input terminal IN2 can be connected to a first terminal of a switch M (not shown) of the switch controller 400. The power supply 100 can receive an input voltage Vin and supply power to a secondary coil of the transformer according to the switch's duty so as to induce an output voltage Vout in the output unit 200.

The output unit 200 may generate a feedback signal, related to the output voltage Vout, to the feedback circuit 300 for control purposes. The switch controller 400 can use the feedback signal to control the duty of the switch M of the power supply 100 to regulate the output voltage Vout.

The output unit 200 may include a diode D1, a capacitor C2, a photodiode PD, a resistor Rpd, a shunt regulator SR, a resistor Rst1, and a resistor Rst2. An anode of the diode D1 can be connected to a secondary coil L2 of the transformer, a first terminal of the capacitor C2 can be connected to an output terminal (+), and a second terminal thereof to an output terminal (−). A first terminal of the resistor Rpd can be connected to the output terminal (+), and a second terminal thereof to an anode of the photodiode PD. A cathode c of a shunt regulator SR can be connected to a cathode of the photodiode PD, and an anode a thereof is grounded. A first terminal of the resistor Rst1 can be connected to the output terminal (+), which can be also connected to the first terminal of the resistor Rpd. A second terminal of the resistor Rst1 can be connected to a reference terminal r of the shunt regulator SR, which can be also connected to a first terminal of the resistor Rst2. A second terminal of the resistor Rst2 can be connected to the anode a of the shunt regulator SR. A voltage Vsr at a node Nsr of the resistor Rst1 and the resistor Rst2 is the reference voltage of the shunt regulator SR.

Power can be stored in the primary coil L1 while the switch is turned on. When the switch is turned off, the power of the primary coil L1 can be transmitted to the secondary coil L2 by inducing a voltage in the secondary coil L2. The output unit 200 generates an output voltage Vout between the output terminals (+) and (−). The output voltage Vout is also charged to the capacitor C2, coupled in parallel to the secondary coil L2. The voltage Vsr can increase according to the output voltage Vout to turn on the shunt regulator SR. A current can flow along the path of the resistor Rpd, the photodiode PD, and the shunt regulator SR. The photodiode PD can output photons corresponding to the flowing current. The photodiode PD forms a photocoupler with the photo transistor PT of the feedback circuit 300. The photodiode PD emits light with an intensity proportional to the current flowing through it. This light generates a current in the phototransistor PT which is proportional to the current of the photo diode PD. Accordingly, the output unit 200 can supply power to the load and provides information corresponding to the output voltage Vout to the feedback circuit 300 so as to regulate the output voltage Vout.

The power supply 100 and the output unit 200 can be configured to convert the input voltage Vin into an output voltage Vout and to output the output voltage Vout according to the switching operation by the switch for controlling the converter. The feedback circuit 300, the switch controller 400, and an auxiliary voltage supplier 500 can be part of the system to control the switching operation of the switch according to the output voltage Vout.

The feedback circuit 300 can include the photo transistor PT, forming a photo-coupler together with a photodiode PD, and a capacitor Cfb coupled in parallel to the photo transistor PT. The photodiode PD can provide information to the feedback circuit 300 corresponding to the output voltage Vout. Thus, the photo transistor PT can be thought of as a dependent current source in the sense of the current flowing through the photo transistor PT corresponds to the output voltage Vout. Therefore, when the output voltage Vout is large, a large current flows through the photo transistor PT. This lowers the feedback voltage Vfb, which is also charged into the capacitor Cfb. When the output voltage Vout is low, a small current flows through the photo transistor PT, increasing the feedback voltage Vfb. In this way, information corresponding to the output voltage Vout is sensed by the feedback circuit 300 and is input to the switch controller 400.

The auxiliary voltage supplier 500 can include an auxiliary coil L3, a capacitor C3, a resistor Rcc1, and a resistor Rcc2. An anode of the diode D2 can be connected to a first terminal of the auxiliary coil L3, and a cathode to a first terminal of the capacitor C3. A second terminal of the capacitor C3 can be grounded, and a voltage VCC at the node between the capacitor C3 and a cathode of the diode D2 can be coupled to an input terminal IN5. The voltage VCC can be used as a bias voltage to power the components of the switch controller 400. A first terminal of the resistor Rcc1 can be connected to the anode of the diode D2. A first terminal of the resistor Rcc2 can be connected to a second terminal of the resistor Rcc1 and a second terminal is grounded. A voltage Vdetect at the node connecting the resistors Rcc1 and Rcc2 is a voltage generated by dividing the voltage Vaus at the first terminal of the auxiliary coil L3 by the resistance ratio of the resistors Rcc1 and Rcc2. The voltage Vaus can be the product of the voltage at the secondary coil L2 and the ratio of the winding numbers. In detail, denoting the winding number of the auxiliary coil L3 by N3 and the winding number of the secondary coil L2 as N2, the voltage Vaus at the auxiliary coil L3 can be expressed as:

$$Vaus = \frac{N3}{N2} V2 \qquad (1)$$

While the switch M is turned off and the voltage is applied to the secondary coil to turn on the diode D1, the voltage at the secondary coil is greater than the output voltage Vout by the threshold voltage of the diode D1, and hence, the voltage Vaus substantially corresponds to the output voltage Vout. Accordingly, the detection voltage Vdetect substantially corresponds to the output voltage Vout.

The switch controller 400 can include a grounded input terminal IN1, an input terminal IN2 connected to the primary coil, an input terminal IN3 connected to the feedback circuit 300 and receiving the feedback voltage Vfb, an input terminal IN4 connected to the auxiliary voltage supply 500 and receiving the detection voltage Vdetect, and the input terminal IN5 connected to the auxiliary voltage supply 500 and receiving the bias voltage VCC. The switch controller 400 can use the feedback voltage Vfb to determine an overload state, and uses the detection voltage Vdetect to determine an output short.

FIGS. 2-5 illustrate an embodiment of the switch controller 400.

Figure 2:
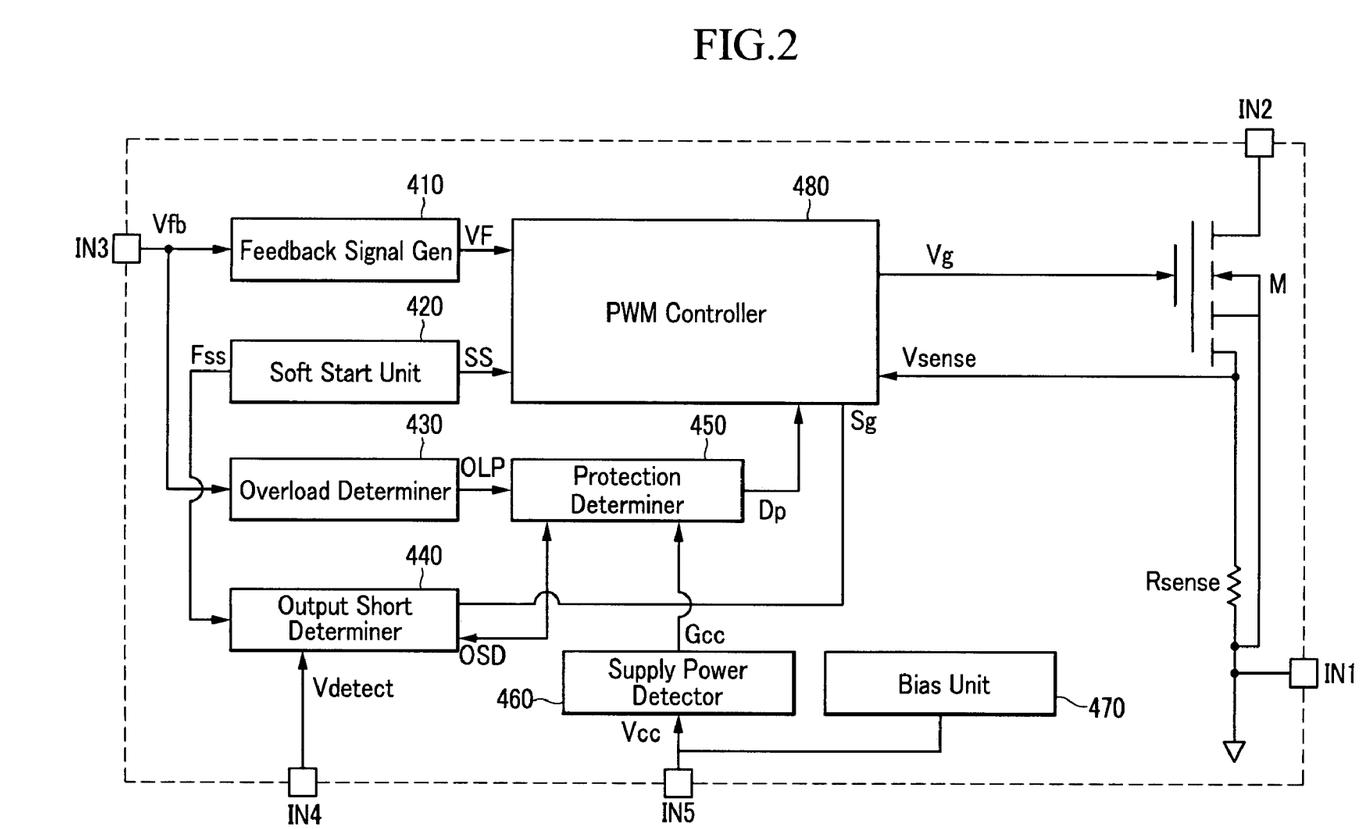
FIG. 2 shows a schematic diagram of the switch controller 400 according to an exemplary embodiment.

FIG. 2 shows a schematic diagram of an embodiment of the switch controller 400. The switch controller 400 can include a switch M, a feedback signal generator 410, a soft start unit 420, an overload determiner 430, a output short determiner 440, a protection determiner 450, a supply voltage detector 460, a bias unit 470, and a PWM controller 480. The switch M can be an n-type metal-oxide semiconductor field-effect transistor (MOSFET). The switch M can have a gate electrode as a control electrode, and a drain electrode and a source electrode. The gate electrode of the switch M can be connected to an output terminal OUT of the switch controller 400. The drain electrode of the switch M can be connected to the first terminal of the primary coil L1, and the source electrode can be connected to a first terminal of a sense resistor Rsense. Alternatively, in other embodiments the switch M can be realized by using other types of transistors. A first terminal of the sense resistor Rsense can be connected to the source electrode of the switch M, and a second terminal thereof can be grounded. When the switch M is turned on, the generated sense voltage Vsense can correspond to the current Ids flowing through the switch M. The sense voltage Vsense can be generated by using the resistor Rsense in the path of the drain current Ids. Other embodiments may use other sensors for sensing the drain current Ids.

The feedback signal generator 410 can include a current source. The current of the current source can be charged into the capacitor Cfb to generate the feedback voltage Vfb. In detail, the current of the current source can be reduced by the amount of current flowing to the photo transistor PT to charge the capacitor Cfb. The feedback signal generator 410 can convert the feedback voltage Vfb into a feedback signal VF appropriate for the PWM controller 480 and transmit the generated feedback signal VF to the PWM controller 480. The feedback signal VF can be a voltage signal that is generated when the feedback voltage Vfb is reduced by a predetermined ratio.

The soft start unit 420 can generate a soft start signal SS for the PWM controller 480 so as to increase the output voltage Vout according to a predetermined form during an initial drive of the converter. The PWM controller 480 can use the soft start signal SS to control the switch M to prevent an excessive switch turn on time. In detail, the soft start unit 420 can transmit a gradually increasing soft start signal SS to the PWM controller 480 before the output voltage Vout is normalized. When the output voltage Vout is normalized, the soft start signal SS can be maintained at a voltage level that is greater than the feedback signal VF. When the output voltage Vout is normalized, the feedback voltage Vfb is reduced. The soft start unit 420 can accordingly determine the finish of the soft start by sensing the feedback voltage Vfb. When the soft start is finished, a soft start finish signal Fss can be transmitted to the output short determiner 440. Other embodiments can function similarly, but based on current signals and not voltage signals.

The overload determiner 430 can determine whether an overload state occurred from the feedback voltage Vfb. The overload determiner 430 can generate an overload protection signal OLP to the protection determiner 450 when it determined that an overload state occurred, which will be described in detail with reference to FIG. 3.

The output short determiner 440 can use the detection voltage Vdetect to sense whether the output terminal became shorted. When the output terminal is shorted, the output voltage Vout can be 0. The output short determiner 440 can use the detection voltage Vdetect corresponding to the auxiliary voltage Vaus to sense whether such an output short state occurred. Since the auxiliary voltage Vaus can correspond to the output voltage Vout, the detection voltage Vdetect, which is generated by dividing the auxiliary voltage Vaus according to the resistance ratio of the resistors Rcc1 and Rcc2, can also correspond to the output voltage Vout. On sensing the output short state, the output short determiner 440 can transmit an output short protection signal OSD to the protection determiner 450.

As an example, the output short determiner 440 can determine an output short state when the soft start is finished. An output short state may occur during the soft start, the initial drive of the converter. However, the output short state may happen temporarily during the soft start. It is not necessary to stop the converter in order to protect the converter in this case. The converter may be stopped during the soft start and then the output voltage Vout of the converter does not reach a rated value. To solve this, the output short determiner 440 may determine the output short state by using the detection voltage Vdetect when detecting the soft start finish after a soft start finish signal Fss is input.

The supply voltage detector 460 can sense the voltage VCC and generate a first level signal Gcc for the protection determiner 480 when the voltage VCC is higher than a reference voltage. The supply voltage detector 460 can generate a second level signal Gcc for the protection determiner 480 when the switching operation is stopped to protect the converter protection and the voltage VCC is less than the reference voltage. Once the protection is triggered, a first flip-flop 453 can be set, the MOSFET may remain off and Vcc capacitor C3 may be discharged until the signal Gcc ("power good") becomes low. Then, the first flip-flop 453 may be reset and switching can be started. This mechanism can guarantee an appropriate non-switching period once protection is triggered.

The bias unit 470 can use the voltage VCC to generate voltages required for operations such as bias voltages of the components of the switch controller 400.

The protection determiner 450 can determine whether to protect the converter according to the overload protection signal OLP and the output short protection signal OSD. The overload protection signal OLP and the output short protection signal OSD respectively can assume a predetermined level when an overload state or an output short state occur. The protection determiner 450 can sense the overload protection signal OLP or the output short protection signal OSD assuming this predetermined level, and determine whether an overload state or a output short state occurred. The protection determiner 450 can notify the PWM controller 480 that an overload state or an output short state occurred by using a protection signal Dp. Also, the protection determiner 450 can be reset according to the signal Gcc when the voltage VCC is less than the reference voltage. The switch controller 400 can restart an operation when the converter is operated again and the supply voltage VCC becomes greater than the reference voltage, which will be described with reference to FIG. 3.

In the case of the soft start drive, the PWM controller 480 can control the switch M by using the sense voltage Vsense generated by the current flowing to the switch M, and the soft start signal SS. The PWM controller 480 can determine the normalized state of the output voltage Vout according to the feedback signal VF. In general, when the output voltage Vout is normalized, the feedback voltage Vfb can be reduced. Because of this, the voltage level of the soft start signal SS can be greater than that of the feedback signal VF. The PWM controller 480 may control the turn-off of the switch M by comparing information corresponding to the current flowing to the switch M with information corresponding to the lower of the soft start signal SS and the feedback signal VF. When the voltage level of the soft start signal SS is greater than that of the feedback signal VF, the soft start is substantially finished.

The bias unit 470 may generate a bias voltage required for the internal bias of the switch controller 400 by using the supply voltage VCC, and may transmit the bias voltage to the respective components. The bias unit 470 can convert the supply voltage VCC to supply the reference voltage used for the components of the switch controller 400.

Figure 3:
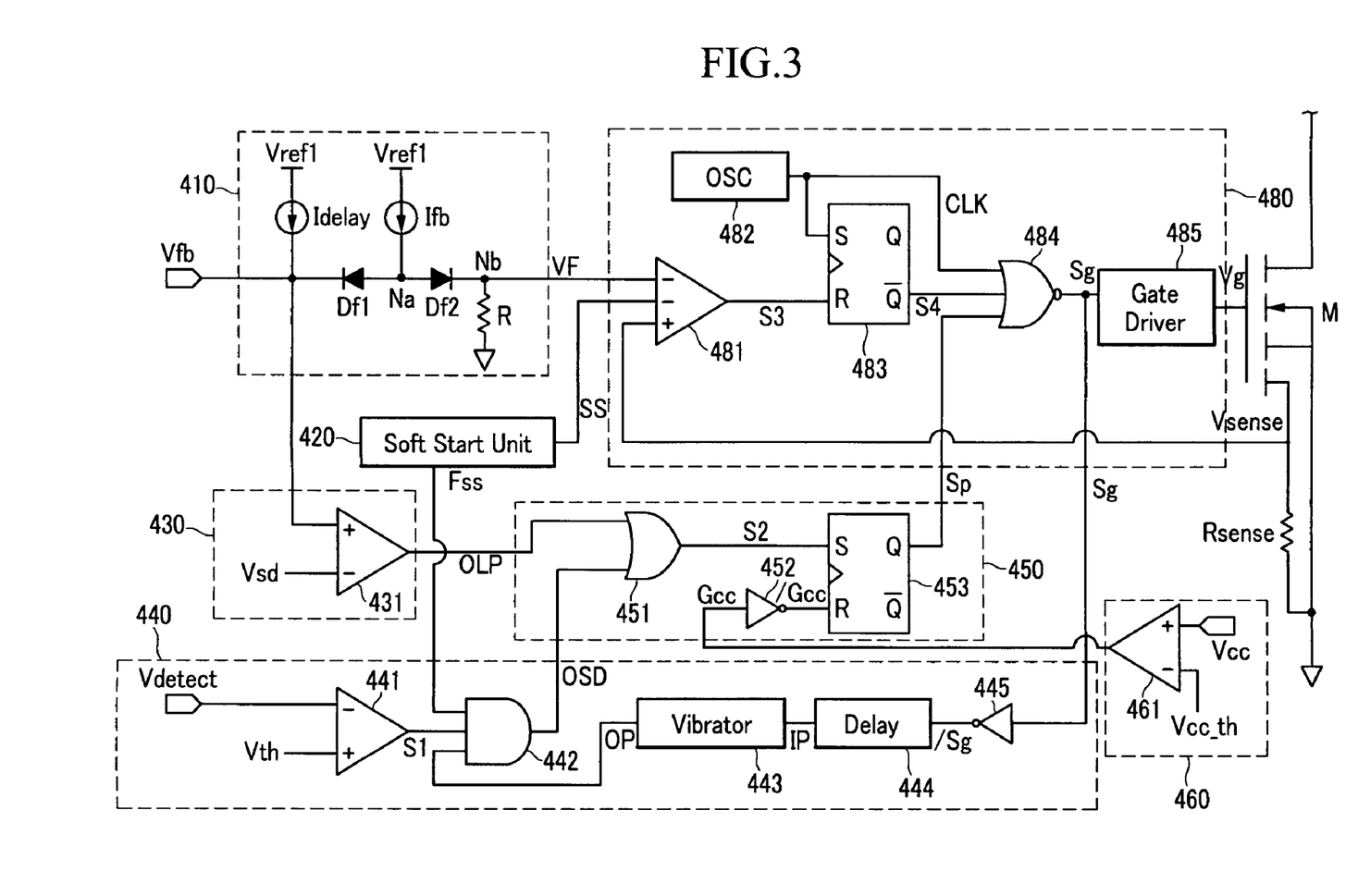
FIG. 3 shows a schematic diagram of the switch controller 400 according to an exemplary embodiment.
Figure 4:
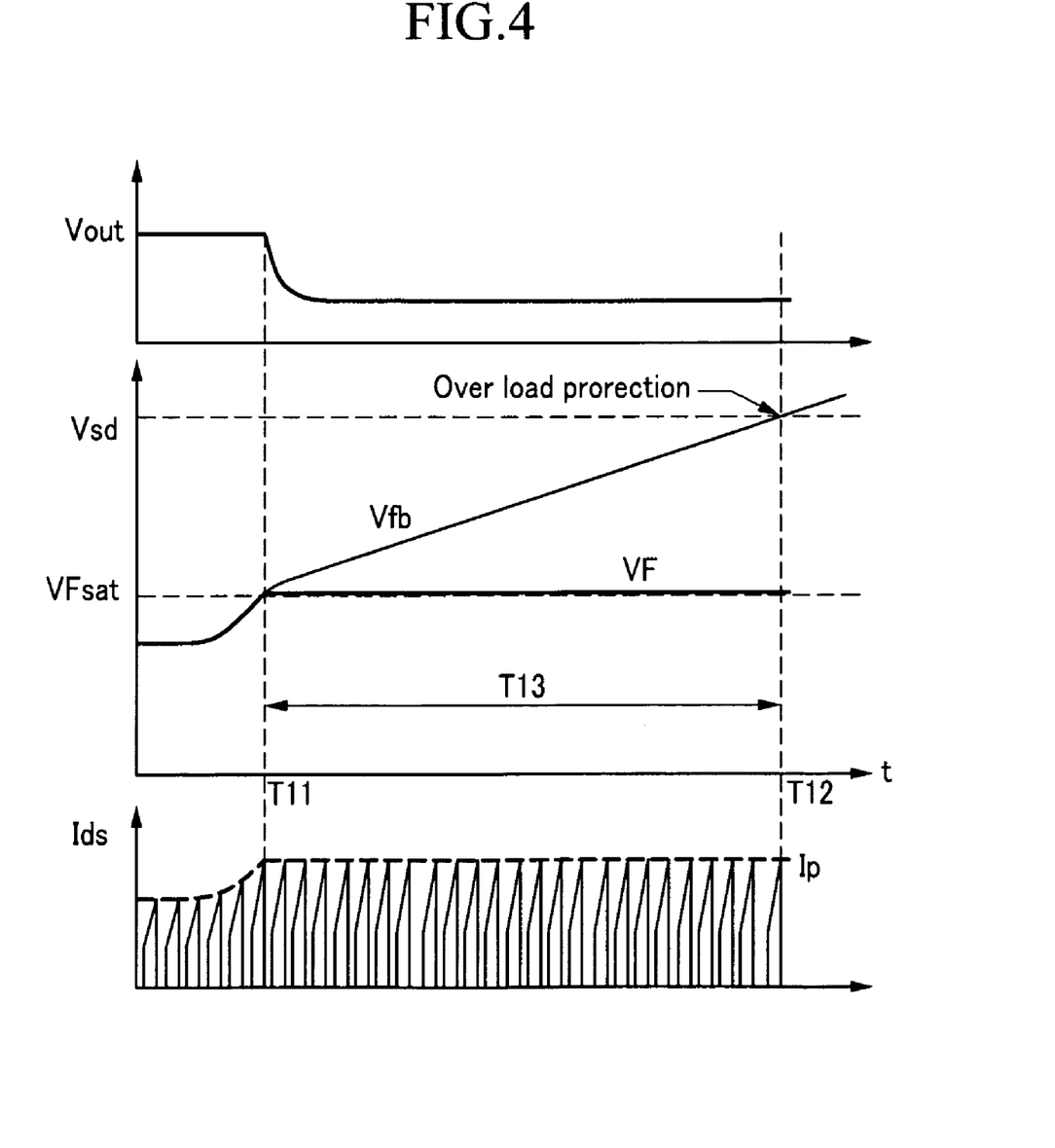
FIG. 4 shows an output voltage Vout, a feedback voltage Vfb, a feedback signal VF, and a switch current Ids when the converter has an overload, according to an exemplary embodiment.

FIG. 3 shows a detailed diagram of a switch controller 400. The feedback signal generator 410 can include a first current source Idelay, a second current source Ifb, diodes Df1 and Df2, and a resistor R. The first current source Idelay may be connected to the feedback circuit 300 to supply current to the feedback circuit 300. The second current source Ifb can be connected to a node Na, located between an anode of the diode Df1 and an anode of the diode Df2. Current will be transmitted to the feedback circuit 300 through pin Vfb, and to the resistor R through a node Nb. When the voltage at the node Na is less than the feedback voltage Vfb plus a threshold voltage of the diode Df1, the diode Df1 is turned off and the current of the second current source Ifb flows to the resistor R. Hence, the feedback signal VF assumes a predetermined level. An example is shown in FIG. 4, where VF holds an essentially constant level VFset during the time interval from T11 to T12.

The feedback circuit 300 and the feedback signal generator 410 can be set to feed the current of the first current source Idelay back to the feedback circuit 300 during an overload state. In an overload state, the voltage at the node Na typically should be less than the sum of the feedback voltage Vfb and the threshold voltage of the diode Df1. For this, the resistance of the resistor R can be set properly. Therefore, in an overload state the diode Df1 is turned off, and the current of the first current source Idelay can be transmitted to the feedback circuit 300. In an overload state the output voltage Vout is also steeply reduced, thus reducing the portion of Idelay which flows to the photo transistor PT. The remaining residual portion of Idelay can flow to the capacitor Cfb where it gradually increases the feedback voltage Vfb. The feedback threshold voltage Vsd can be set to a voltage, which is reached by the feedback voltage Vfb when the overload state persists for a predetermined time. With this design, the switch M will be turned off when the overload state persists for a predetermined time, thereby preventing the switch M from being turned off during a temporary overload state.

The overload determiner 430 may compare the feedback voltage Vfb and the feedback threshold voltage Vsd to determine whether an overload state occurred. The overload determiner 430 can include a comparator 431 for receiving the feedback voltage Vfb through a non-inverting terminal, and a feedback threshold voltage Vsd through an inverting terminal. The overload protection signal OLP output by the comparator 431 can be transmitted to an OR gate 451 of the protection determiner 450.

The output short determiner 440 can include a comparator 441, an AND gate 442, a vibrator 443, a delay unit 444, and an inverter 445. The comparator 441 can receive the detection voltage Vdetect through the inverting terminal (−) and the output short threshold voltage Vth through the non-inverting terminal (+), output a high level signal S1 when the detection voltage Vdetect is less than the output short threshold voltage Vth, and output a low level signal S1 when the detection voltage Vdetect is greater than the output short threshold voltage Vth. The inverter 445 can invert a gate drive control signal Sg output by a NOR gate 484 of the PWM controller 480 and transmit the inverted gate drive control signal /Sg to the delay unit 444. When the gate driver control signal Sg is high, a gate driver 485 can generate a gate control signal Vg for turning on the switch M, and when the gate driver control signal Sg is low, the gate driver 485 can generate a gate control signal Vg for turning off the switch M. The delay unit 444 can delay the inverted gate driver control signal /Sg for a first delay time of Td, and transmit an input pulse signal IP to the vibrator 443. The vibrator 443 can output an output pulse signal OP synchronously with the input pulse signal IP. In detail, the vibrator 443 may generate a high level pulse signal OP during a first period synchronously with the rising edge of the input pulse signal IP. The first period may be shorter than the high level period of the input pulse signal IP. The vibrator 443 may generate an output pulse signal OP and transmit it to the AND gate 442 synchronously with the input pulse signal IP. An output pulse signal OP with a high level can be transmitted to the AND gate 442 after the switch M is turned off, delayed by the first delay time Td.

The AND gate 442 can perform an AND operation on the soft start finish signal FSS of the soft start unit 420, the signal S1 and the output pulse signal OP to generate a output short protection signal OSD. When the detection voltage Vdetect is less than the output short threshold voltage Vth at a first delay time Td after the switch M is turned off after the soft start is finished, the output short determiner 440 can determine that an output short state occurred. In this case, the output short determiner 440 can prevent the switch M from being turned off because of the temporary short phenomenon that occurs during the soft start period.

The output short determiner 440 can accurately determine the output short state by disabling the detection until the switching noise disappears. In detail, when the waveform of the detection voltage Vdetect rises after the switch M is turned off, a noise may be present at the leading edge of the waveform of the detection voltage Vdetect. The output short determiner 440 may falsely identify this noisy waveform as an output short state even when no actual short occurred. To prevent this problem, the output short determiner 440 can determine whether the output short state occurred at a first delay time Td after the leading edge. The output short determiner 440 can use the gate drive control signal Sg to detect the switch turn-off time and compare the detection voltage Vdetect and the output short threshold voltage Vth after the first delay time Td passed to determine whether the output short state occurred. With this design, stopping the converter because of a fictitious output short state, induced by the noise of the detection voltage Vdetect, can be prevented. The first delay time Td can be set to be an interval corresponding to the leading edge of the waveform of the detection voltage Vdetect including noise.

The supply voltage detector 460 can include a comparator 461. The comparator 461 may receive the supply voltage VCC through a non-inverting terminal (+) and compare it with the supply threshold voltage VCC_th that is input through the inverting terminal (−). When the supply voltage VCC is greater than the supply threshold voltage VCC_th, a high level signal Gcc can be generated and transmitted to the inverter 452 of the protection determiner 450. When the supply voltage VCC is less than the supply threshold voltage VCC_th, a low level signal Gcc can be generated and transmitted to the inverter 452 of the protection determiner 450.

The protection determiner 450 may include an OR gate 451, an inverter 452, and a first flip-flop 453. The OR gate 451 can receive an overload protection signal OLP and an output short protection signal OSD. The OR gate 451 may perform an OR logical operation on the received signals and output a signal S2 to a set terminal S of the first flip-flop 453. When one of the overload protection signal OLP and the output short protection signal OSD is high, the OR gate 451 generates a high level signal S2 and transmit the generated signal S2 to the set terminal S of the first flip-flop 453.

The first flip-flop 453 may output a high level protection signal Sp to the output terminal Q. The protection signal Sp can be transmitted to a NOR gate 484 of the PWM controller 480. The NOR gate 484 can generate and transmit a low level gate drive control signal Sg to the gate driver 485 irrespective of other input signals. The gate driver 485 can generate and transmit a gate control signal Vg to the gate electrode of the switch M, prompted by the low level gate drive control signal Sg. This gate control signal Vg turns off the switch M. When one of the overload protection signal OLP and the output short protection signal OSD assumes a high level, a protection operation for the converter with the turned off switch M can be performed. When the switch M is turned off, the supply voltage VCC may be reduced. When the supply voltage VCC is less than the supply threshold voltage VCC_th, a low level signal Gcc is transmitted to the inverter 452. The inverter 452 inverts the signal Gcc and transmits the inverted signal /Gcc to a reset terminal R of the first flip-flop 453. In response, a low level protection signal Dp can be output from the output terminal Q of the first flip-flop 453. When the converter's protection is performed by the protection determiner 450 and the supply voltage VCC becomes less than the supply threshold voltage VCC_th, the protection determiner 450 may be reset.

When the supply voltage VCC rises above the supply threshold voltage VCC_th, the signal Gcc can become high. The inverter 452 inverts the high level signal Gcc into an inverted signal /Gcc, and transmits the inverted signal to the reset terminal R of first flip-flop 453. The protection signal Dp can be output according to the signal that is input to the set terminal S of the first flip-flop 453. When one of the overload protection signal OLP and the output short protection signal OSD becomes high again, the protection signal Dp becomes high to turn off the switch M.

The PWM controller 480 can include a comparator 481, a second flip-flop 483, an oscillator 482, a NOR gate 484, and a gate drive 485. The comparator 481 can be operable by the "low dominant method". This method includes comparing the sense voltage Vsense with the lesser of the feedback signal VF and the soft start signal SS as described above. The soft start signal SS can be less than the feedback signal VF during the soft start period, and the feedback signal VF can be less than the soft start signal SS when the soft start period is finished. The comparator 481 may transmit a signal S3 to a reset terminal R of the second flip-flop 483 according to the result of the comparison of Vsense, VF and SS. The comparator 481 can receive the sense voltage Vsense through the non-inverting terminal (+) and the feedback signal VF and the soft start signal SS through the two inverting terminals (−). In response, the comparator 481 may output the signal S3 with a high level when the sense voltage Vsense is greater than the lesser one of the feedback signal VF and the soft start signal SS. Further, the comparator 481 may output a low level signal S3 when the sense voltage Vsense is less than the lesser one of the feedback signal VF and the soft start signal SS. When the soft start period is finished, the comparator 481 can compare the feedback signal VF and the sense voltage Vsense and output the signal S3. That is, when the sense voltage Vsense becomes equal to the feedback signal VF, a high level signal S3 can be output.

The second flip-flop 483 may transmit a high level signal S4 from an inverting output terminal ($\overline{Q}$) to the NOR gate 484 in response to the high level signal S3 input to its reset terminal R. The switch M can be turned off by the high level signal S4 irrespective of other signals that are input to the NOR gate 484. When the switch M is turned off and the sense voltage Vsense becomes less than the feedback signal VF, the signal S3 becomes low. At this time the clock signal CLK can be synchronized with falling edge timing that becomes low, and the NOR gate 484 can generate a high level gate drive control signal Sg. The gate driver 485 can generate a gate control signal Vg according to the gate drive control signal Sg, and transmit the same to a gate electrode of the switch M. In embodiments, where the switch M is an N channel type transistor, the gate control signal Vg becomes a sufficiently high level voltage that can turn on the switch M according to the high level gate drive control signal Sg, and it becomes a sufficiently low level voltage that can turn off the switch M according to the low level gate drive control signal Vg.

An operation of the converter will now be described with reference to FIG. 4 and FIG. 5. FIG. 4 shows waveforms of the output voltage Vout, the feedback voltage Vfb, the feedback signal VF, and the switch current Ids when the converter is in an overload state.

When the load connected to the converter increases to generate an overload state, the output voltage Vout of the converter can steeply decrease at a time T11 since the supply power of the converter is essentially constant, thus the current supplied to the load steeply increases in an overload state. The output voltage Vout steeply decreases at time T11 and the feedback voltage Vfb and the feedback signal VF can increase to reach a saturation feedback voltage VFsat. The saturation feedback voltage VFsat is the maximum voltage of the feedback signal VF that can be input to the VF inverting terminal (−) of the comparator 481. In some embodiments, the comparator 481 is designed so that a voltage greater than the saturation feedback voltage VFsat may not be input to the VF inverting terminal (−).

The saturation feedback voltage VFsat can be the voltage at the node Nb when the diode Df1 is turned off and the current of the current source Ifb flows to the resistor R. In the overload state, the saturation feedback voltage VFsat can determine the peak value Ip of a (drain-source) current Ids of the switch M. When the sense voltage Vsense reaches the saturation feedback voltage VFsat, the switch M can be turned off, and hence the peak value Ip of the current Ids is determined by the saturation feedback voltage VFsat.

Hereinafter, the state in which the converter is not in the overload state or the output short state will be called a normal state. The diode Df1 that is turned on and operated in the normal state can be turned off when the feedback signal VF reaches the saturation feedback voltage VFsat in the overload state. In detail, when the output voltage Vout decreases and thus the current flowing to the photo transistor PT decreases, the feedback voltage Vfb increases. The diode Df1 is turned off when the increased feedback voltage Vfb reaches the voltage generated by subtracting the threshold/onset voltage of the diode Df1 from the voltage at the node Na. The current of the first current source Idelay charges the capacitor Cfb, and the feedback voltage Vfb increases to reach the voltage Vref1 connected to the first current source Idelay. When the feedback voltage Vfb reaches the voltage Vsd during its increase, the overload short signal OLP can become high and the switch M is turned off. When the switching operation of the switch M is stopped at time T11, at which time the feedback voltage Vfb reaches the saturation feedback voltage VFsat, the converter may shut down prematurely. In detail, when the overload state is eventually generated in the acceleration mode by a device such as a CD-ROM (compact disk read only memory) or a DVDP (digital video disc player), the converter's protection operation such as premature shutdown causes a problem. Here the term "acceleration mode" refers to the mode of operation when the rotational speed of a device, such as a motor, increases. In such an acceleration mode the circuits, including the motor, may require currents in excess of the constant speed operation. This sometimes may induce over load condition to the power supply. During the period in which the load changes and during the start-up period, though the converter is not in the overload state, the feedback voltage Vfb may temporarily increase to the saturation feedback voltage VFsat. When such a temporary overload state is reached and the feedback voltage Vfb increases to reach the saturation feedback voltage VFsat, the operation of the converter may be terminated in the acceleration mode, leading to problems during the acceleration. To solve the problem, in some embodiments the switch M is not turned off during the period of T13, in which the feedback voltage Vfb reaches the saturation feedback voltage VFsat and then increases to the overload reference voltage Vsd. As a result, the converter is not prematurely shut down during the temporary overload state. Referring to FIG. 4, the period of T13 from T11 to T12 can be set according to the device that uses the converter, and can be calculated as:

$$T13 = \frac{Cfb(Vsd - VFsat)}{Idelay} \quad (2)$$

When the feedback voltage Vfb increases to the overload threshold voltage Vsd and the overload protection signal OLP becomes high, the OR gate 451 of the protection determiner 450 can output a high level signal S2 and the first flip-flop 453 can output a high level protection signal Dp through the output terminal Q according to the signal S2 that is input at the set terminal S. The NOR gate 484 can output a low level gate drive control signal Sg to the gate driver 485. Accordingly, the gate driver 485 can turn off the switch M. After time T12, current Ids may go to zero and voltage VF may also drop to zero.

Figure 5:
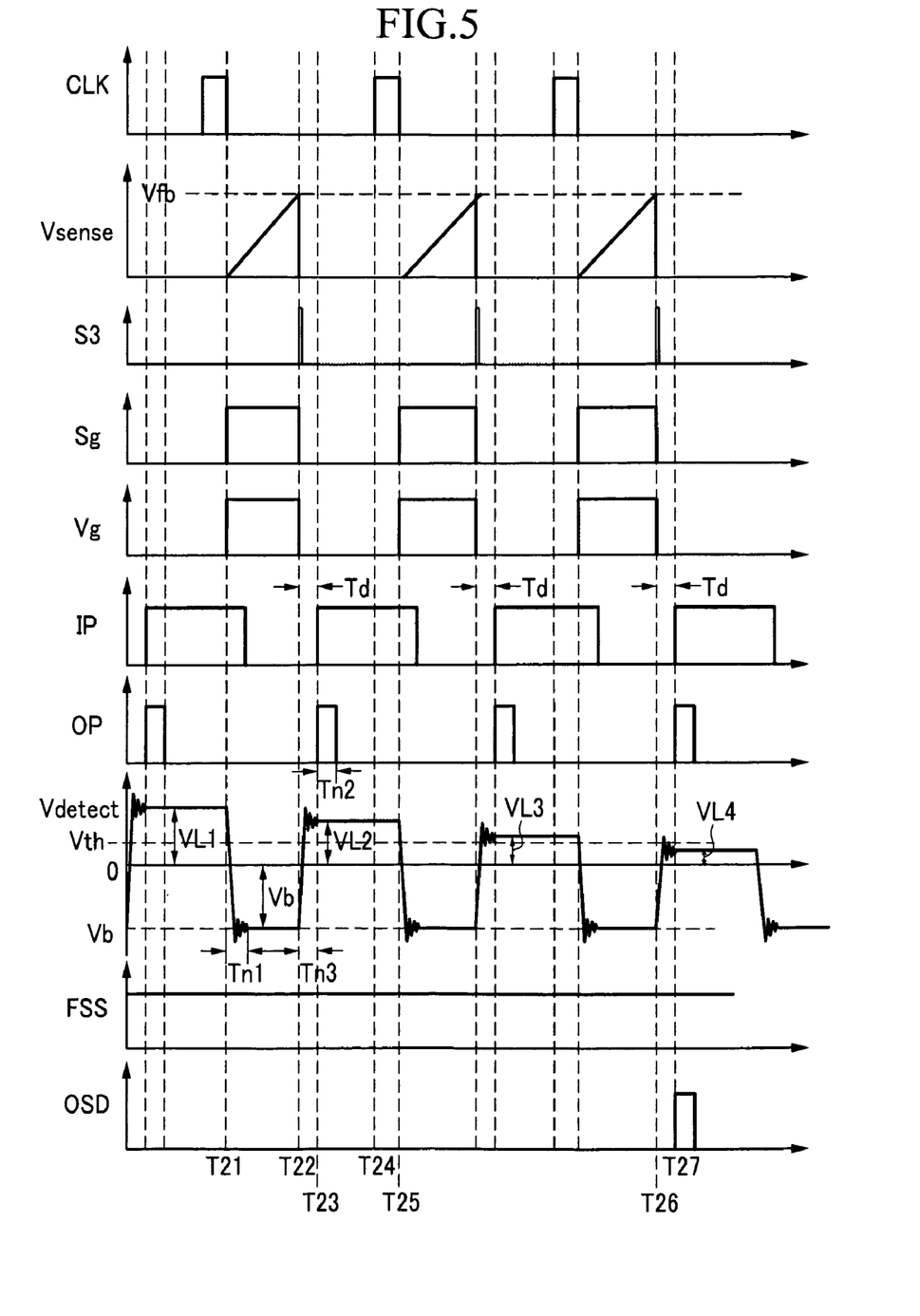
FIG. 5 shows internal signals of a converter when a output short occurs while the converter is operated according to an exemplary embodiment.

Referring to FIG. 5, the operation of the converter in the output short state will now be described.

FIG. 5 shows internal signals of an embodiment of a converter when an output short occurs during the operation of the converter. Since the output short state is determined after the soft start period is finished, the soft start finish signal FSS is typically remains at a high level.

At time T21, a gate control signal Vg becomes high synchronously with the falling edge of the clock signal CLK. Accordingly, the switch M is turned on and the sense voltage Vsense increases according to the current Ids flowing to the switch M. At T22, when the sense voltage Vsense reaches the feedback voltage Vfb, the comparator 481 can generate a high level pulse waveform for the signal S3. Accordingly, the signal S4 also becomes high, the gate drive control signal Sg becomes low, the gate control signal Vg also becomes low and the switch M is turned off.

During the same time interval, the detection voltage Vdetect can decrease steeply at T21. Vdetect may include a noise component for the interval Tn1, starting at about T21. After time interval Tn1, Vdetect can remain essentially steady at the level Vb. The absolute value of the voltage Vb can be proportional to the absolute value of the input voltage Vin in FIG. 1.

At time T22, when the switch M is turned off, the detection voltage Vdetect can steeply increase. At time T22, a low level gate drive control signal Sg can be input into the inverter 445, generating a high level inverted gate drive control signal /Sg. The inverted gate drive control signal /Sg can be delayed by the first delay time Td by the delay unit 444. When the inverted gate drive control signal /Sg is delayed by the first delay time Td, it can become an input pulse signal IP, input into the vibrator 443. The vibrator 443 can output a high level output pulse signal OP for a time interval Tn2, starting at time T23. T23 is also the rising edge timing of the input pulse signal IP. At time T24, when the clock signal CLK becomes high, a low level signal can be output at the inverting output terminal ($\overline{Q}$) of the second flip-flop 483.

At time T25 the clock signal CLK can become low again. The protection signal Dp can be also low at T25, since it is high only in the output short or the overload state. Therefore, since the signals input to the NOR gate 484 are low, the gate drive control signal Sg becomes high. The switch M is turned on according to the high level gate drive control signal Sg.

As described with reference to Equation 1, the detection voltage Vdetect can be proportional to the voltage V2 of the secondary coil L2. Vdetect can steeply increase at time T22 and include a noise component during a predetermined period Tn3. During the period from T23 to T25, the detection voltage Vdetect maintains the voltage level VL2. When the switch M is turned on at T25, the detection voltage Vdetect can change to the voltage Vb. The converter can generate an output voltage Vout by repeating the above-described operation.

As shown in FIG. 5, the first delay time Td can be set to correspond to the period in which the detection voltage Vdetect steeply increases and has a noise component after the switch M is turned off. The voltage levels VL1, VL2, VL3, and VL4 of the detection voltage Vdetect during subsequent intervals in which the switch M is turned off, gradually decrease in the case when the output voltage Vout is reduced to generate an output short. The switch M is turned off at time T26, and the detection voltage Vdetect can become less than the output short threshold voltage Vth at time T27, once the noise in the detection voltage Vdetect decays.

At this time T27 the comparator 441 can generate a high level signal S1. The output pulse signal OP of the vibrator 443 can be high during time interval Tn2. Therefore, since the signal S1 input to the AND gate 442, the soft start finish signal FSS, and the output pulse signal OP are high, the AND gate 442 outputs a pulse signal that has a high level output short protection signal OSD during the time interval Tn2. When the converter is shorted, the voltage Vaus of the auxiliary coil L3 becomes essentially zero. The voltage Vaus is tracked by the voltage Vdetect, which is scaled from Vaus by the ratio Rcc2/(Rcc1+Rcc2). The output short threshold voltage Vth is greater than zero. Therefore, the switch M is turned off before the output short state is generated, thereby protecting the converter. Hence, the present invention can prevent the switch M from being turned on in the output short state by the minimum turn on time to be caused by the converter's internal delay time and the leading edge blanking time (LEB).

Embodiments of the switch controller 400 can compare the detection voltage Vdetect and the output short threshold voltage Vth, and turn off the switch M and protect the converter before the converter is shorted, i.e. the output voltage Vout becomes zero. Further, after the blanking period of the first delay time Td is passed, the switch controller 400 may compare the detection voltage Vdetect and the output short threshold voltage Vth to determine whether an output short state occurred so that the malfunction caused by the noise that is generated at the leading edge of the detection voltage Vdetect can be prevented. Finally, since the output short state is determined only after the soft start period is finished, the problem of terminating the operation of the converter when the state is mistakenly identified as an output short state during the soft start period can be prevented.

Figure 6:
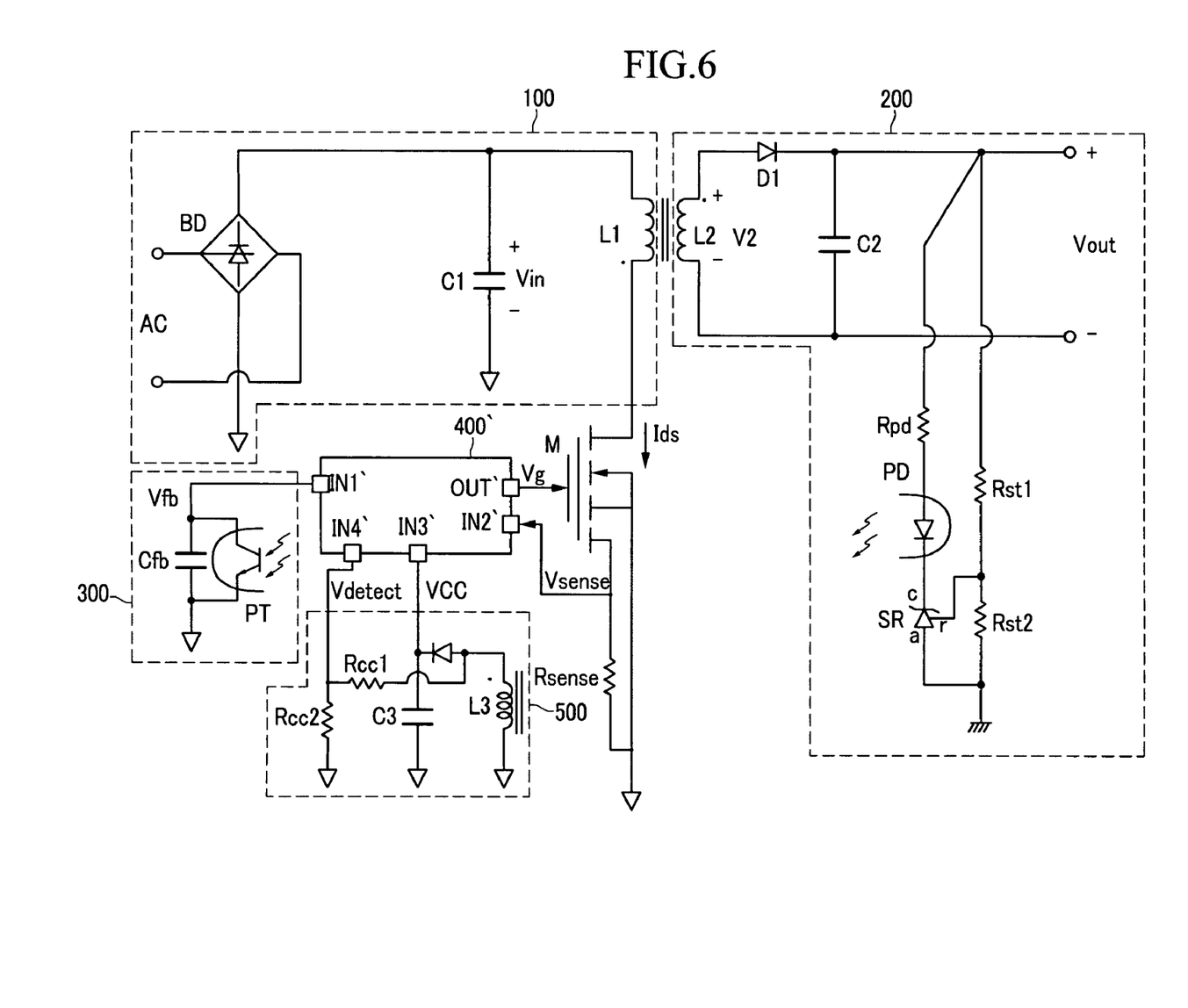
FIG. 6 shows the switch controller 400' and a converter including the same according to an exemplary embodiment.

FIG. 6 shows another embodiment of a switch controller 400' and a converter. In some embodiments the switch M and the switch controller 400" could be integrated into an IC. However, the illustrated switch controller 400' does not include the switch M: the switch M and the switch controller 400' are configured as separate packets. Since the switch controller 400' does not include switch M, the sense voltage Vsense can be input to the input terminal IN2' so as to provide sensing information about the current Ids flowing to the switch M. The gate control signal Vg can be transmitted to the gate electrode of the switch M through an output terminal OUT'. In addition, input terminals IN1', IN3', and IN4' of the switch controller 400' are respectively connected to the feedback circuit 300 and the auxiliary voltage supplier 500, and the switch controller 400' receives the feedback voltage Vfb, the voltage VCC, and the detection voltage Vdetect at these input terminals, respectively. In analogy to the first embodiment of the switch controller 400, this embodiment of the switch controller 400' also includes a feedback signal generator 410, a soft start unit 420, an overload determiner 430, an output short determiner 440, a protection determiner 450, a bias voltage sensor 460, a bias unit 470, and a PWM controller 480.

Accordingly, the switch controller 400' can be also utilized to control the soft start of the converter. The switch controller 400' can be realized without a circuit having a large size and a complicated structure, such as the conventional counter and a digital/analog converter.

While only particular embodiments have been described above, it is to be understood that the invention is not limited to the disclosed embodiments, but, on the contrary, is intended to cover various modifications and equivalent arrangements included within the spirit and scope of the appended claims.

In some embodiments, a converter and a converter driving method prevent a power witch from being turned on during a minimum turn on time while the converter is shorted.

In some embodiments, a converter and a converter driving method prevent a malfunction by determining the output short state after a blanking period is provided by the first delay time Td.

Since the output short state is determined after the soft start period is finished the problem of shutting down the converter because of a mistaken identification of an output short state during the soft start period is prevented.

In some embodiments, a converter and a converter driving method prevent the premature shutdown of the converter in an overload state.

What is claimed is:

1. A method for driving a converter for converting an input signal into an output signal according to a switching operation by a switch, the method comprising:
   determining the converter being in an output short state when a soft start is finished by using a detection signal corresponding to an input signal while the switch is turned on and to an output signal while the switch is turned off;
   determining the converter being in an overload state by using a feedback voltage corresponding to the output signal; and
   terminating the switching operation when the converter is determined to be in one of the output short state and the overload state.

2. The method of claim 1, wherein the determining of the output short state includes:
   determining whether the soft start is finished;
   comparing the detection signal and an output short threshold voltage having a predetermined level; and
   determining whether a first delay time, in which the noise of the detection signal substantially decayed below a predetermined low level, is passed after the switch is turned off.

3. The method of claim 2, wherein the determining of the output short state comprises:
   determining whether the converter is in a output short state when the soft start is finished;
   determining whether the detection signal is less than the output short threshold voltage; and
   determining whether the first delay time is passed.

4. The method of claim 1, wherein the determining of the overload state comprises
   comparing the feedback voltage and an overload threshold voltage, wherein the overload threshold voltage is set to a level the feedback voltage assumes when the overload state of the converter persists for a predetermined time.

5. A converter for converting an input signal into an output signal according to a switching operation by a switch, the converter comprising:
   a switch controller, configured to determine the converter being in an output short state by using a detection signal after a soft start is finished, configured to determine the converter being in an overload state by using a feedback voltage corresponding to the output signal, and configured to terminate the switching operation when the converter is in one of the overload state and the output short state, wherein
   the detection signal corresponds to the input signal when the switch is turned on, and corresponds to the output signal when the switch is turned off.

6. The converter of claim 5, wherein
   the switch controller is configured to determine the converter being in the output short state according to the comparison result of the detection signal and an output short threshold voltage when the switch is turned off and a delay time passed, wherein the output short threshold voltage is greater than the voltage of the detection signal corresponding to the output signal of the converter.

7. The converter of claim 6, wherein
   the delay time is set so as to reduce a noise of the detection signal below a predetermined level.

8. The converter of claim 5, wherein
   the switch controller is configured to compare the feedback voltage and an overload threshold voltage to determine the converter being in the overload state, wherein the overload threshold voltage is set to a level the feedback voltage assumes when the overload state of the converter persists for a predetermined time.

9. A converter comprising:
a switch;
an input unit configured to convert an input signal and supply power to an output unit according to a switching operation of the switch;
the output unit configured to generate an output signal by using the supplied power;
a feedback circuit configured to generate a feedback voltage corresponding to the output signal; and
a switch controller configured to determine the converter being in an output short state by using a detection signal after the soft start is finished, to determine the converter being in an overload state by using a feedback voltage corresponding to the output signal, and to terminate the switching operation when the converter is in one of the overload state and the output short state, wherein
the detection signal corresponds to the input signal while the switch is turned on and corresponds to the output signal while the switch is turned off.

10. The converter of claim 9, wherein the switch controller comprises:
a output short determiner configured to determine the output short state by using the detection signal;
an overload determiner configured to determine an overload state by using the feedback voltage; and
a PWM controller configured to control the switch according to a feedback signal corresponding to the feedback voltage, a current flowing to the switch, and outputs of the output short determiner and the overload determiner.

11. The converter of claim 10, wherein the output short determiner comprises:
a first comparator configured to compare the detection signal and a output short threshold voltage, and to generate a first signal according to a comparison result; and
a first logical operator configured to receive a soft start finish signal for indicating the soft start finish, the first signal, and an output pulse signal that is generated according to a time when the switch is turned off and a delay time elapses, wherein
the output short threshold voltage is greater than the voltage of a detection signal corresponding to an output signal of the converter in the output short state, and the delay time is set to reduce a noise of the detection signal below a predetermined level.

12. The converter of claim 11, wherein
the soft start finish signal is high, the first signal becomes high when the detection signal is less than the output short threshold voltage, the output pulse signal becomes high when the delay time elapses, and the logical operator is configured to perform an AND operation.

13. The converter of claim 11, wherein the overload determiner comprises a second comparator, configured to compare the feedback voltage and an overload threshold voltage, and the overload threshold voltage is set to be a level the feedback voltage assumes when the overload state of the converter persists for a predetermined time.

14. The converter of claim 13, wherein
the switch controller further comprises a protection determiner configured to generate a protection signal for terminating the switching operation when the state is one of the overload state and the output short state, and
the protection determiner comprises:
a second logical operator configured to receive output signals of the first comparator and the second comparator; and a first flip-flop configured to generate the protection signal according to an output signal of the second logical operator, and to reset the protection signal when a voltage for an internal bias for the switch controller is less than a predetermined voltage.

15. The converter of claim 14, wherein
the second logical operator is configured to perform an OR operation on the output signals of the first comparator and the second comparator, and the first flip-flop is configured to generate a high level protection signal when the output signal of the second logical operator is high.

16. The converter of claim 15, wherein
the PWM controller comprises:
a third comparator configured to compare the feedback signal and a sense voltage corresponding to the current flowing to the switch when the soft start is finished;
an oscillator configured to generate clock signals with a predetermined period;
a second flip-flop configured to receive the output signal of the third comparator through a reset terminal and receiving the clock signals through a set terminal;
a third logical operator configured to receive an output signal of an inversion terminal of the second flip-flop, the protection signal, and the clock signal, and to generate a second signal for turning off the switch when one of the input signals is a first level; and
a gate driver configured to generate the gate control signal according to the second signal.

17. The converter of claim 16, wherein the output short determiner comprises:
an inverter configured to invert the second signal;
a delay unit configured to delay the inverted second signal by a delay time; and
a vibrator configured to generate an output pulse signal synchronously with an output signal of the delay unit.

18. A converter comprising:
a transformer configured to transform input energy into output energy;
a switch connected to a primary coil of the transformer and controlling the transformer;
an auxiliary coil configured to generate an auxiliary voltage corresponding to a voltage of a secondary coil of the transformer when the switch is turned off;
a switch controller configured to determine the converter being in an output short state by using a detection voltage corresponding to the auxiliary voltage when a soft start is finished, to determine the converter being in an overload state by using a feedback voltage corresponding to the output energy, and to terminate the switching operation when the converter is in one of the overload state and the output short state.

19. The converter of claim 18, wherein
the switch controller comprises:
a first comparator configured to compare the detection signal and a output short threshold voltage, and to generate a first signal according to a comparison result;
a output short determiner including a first logical operator configured to receive a soft start finish signal for indicating the soft start finish, the first signal, and an output pulse signal that is generated according to a time when the switch is turned off and a delay time elapses; and
a PWM controller configured to control the switch according to a feedback signal corresponding to the feedback voltage, a current flowing to the switch, and outputs of the output short determiner and the overload determiner, wherein the output short threshold voltage is greater than the voltage of a detection signal corresponding to an output signal of the converter in the output short state, and the delay time is set so as to prevent noise of the detection signal.

20. The converter of claim 19, wherein
the soft start finish signal is high, the first signal becomes high when the detection voltage is less than the output short threshold voltage, the output pulse signal becomes high when the delay time elapses, and the logical operator performs an AND operation.

21. The converter of claim 19, wherein
the switch controller further comprises an overload determiner including a second comparator configured to compare the feedback voltage and an overload threshold voltage, and the overload threshold voltage is set to be a level the feedback voltage assumes when the overload state of the converter persists for a predetermined time.

22. The converter of claim 21, wherein
the switch controller further comprises a protection determiner configured to generate a protection signal for terminating the switching operation when the state is one of the overload state and the output short state, and
the protection determiner comprises:
a second logical operator configured to receive output signals of the first comparator and the second comparator; and
a first flip-flop configured to generate the protection signal according to an output signal of the second logical operator, and to reset the protection signal when a voltage at a capacitor charged by the current that flows to the auxiliary coil is less than a predetermined voltage.

23. The converter of claim 22, wherein
the second logical operator is configured to perform an OR operation on the output signals of the first comparator and the second comparator, and the first flip-flop is configured to generate a high level protection signal when the output signal of the second logical operator is high.

24. The converter of claim 23, wherein
the PWM controller comprises:
a third comparator configured to compare the feedback signal and a sense voltage corresponding to the current flowing to the switch when the soft start is finished;
an oscillator configured to generate clock signals with a predetermined period;
a second flip-flop for receiving the output signal of the third comparator through a reset terminal and receiving the clock signals through a set terminal;
a third logical operator configured to receive an output signal of an inversion terminal of the second flip-flop, the protection signal, and the clock signal, and generating a second signal for turning off the switch when one of the input signals is a first level; and
a gate driver configured to generate the gate control signal according to the second signal.

25. The converter of claim 24, wherein
the output short determiner comprises:
an inverter configured to invert the second signal;
a delay unit configured to delay the inverted second signal by a delay time; and
a vibrator configured to generate an output pulse signal in synchronization with an output signal of the delay unit.

* * * * *